(12) United States Patent
Mizuno

(10) Patent No.: US 12,141,911 B2
(45) Date of Patent: Nov. 12, 2024

(54) GENERATION APPARATUS, GENERATION METHOD, AND STORAGE MEDIUM

(71) Applicant: CANON KABUSHIKI KAISHA, Tokyo (JP)

(72) Inventor: Shogo Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 17/544,786

(22) Filed: Dec. 7, 2021

(65) Prior Publication Data

US 2022/0189103 A1 Jun. 16, 2022

(30) Foreign Application Priority Data

Dec. 15, 2020 (JP) ................................. 2020-207877
Sep. 9, 2021 (JP) ................................. 2021-146788

(51) Int. Cl.
*G06T 15/10* (2011.01)
*G06T 7/55* (2017.01)
*G06T 7/66* (2017.01)
*G06T 7/70* (2017.01)
*G06V 10/24* (2022.01)

(52) U.S. Cl.
CPC ................ *G06T 15/10* (2013.01); *G06T 7/55* (2017.01); *G06T 7/66* (2017.01); *G06T 7/70* (2017.01); *G06V 10/24* (2022.01)

(58) Field of Classification Search
CPC ........... G06V 10/24; G06T 15/10; G06T 7/55; G06T 7/70; G06T 7/66; G06T 15/20
See application file for complete search history.

(56) References Cited

U.S. PATENT DOCUMENTS

| | | | |
|---|---|---|---|
| 2019/0037137 A1* | 1/2019 | Toksvig ................ | H04N 21/816 |
| 2019/0041974 A1* | 2/2019 | Matsuike ................ | G06F 3/012 |
| 2019/0158802 A1* | 5/2019 | Higuchi ................ | H04N 13/167 |
| 2019/0262709 A1* | 8/2019 | Nakamura ............ | A63F 13/428 |
| 2020/0013214 A1* | 1/2020 | Kuffner ................... | G06T 15/20 |
| 2020/0162714 A1* | 5/2020 | Kwak ........................ | G06T 3/18 |
| 2020/0234495 A1* | 7/2020 | Nakao ................. | A63F 13/5258 |

FOREIGN PATENT DOCUMENTS

| | | |
|---|---|---|
| JP | 2008015756 A | 1/2008 |
| JP | 2020086983 A | 6/2020 |

* cited by examiner

*Primary Examiner* — Phi Hoang
(74) *Attorney, Agent, or Firm* — Canon U.S.A., Inc. IP Division

(57) ABSTRACT

A generation apparatus includes an acquisition unit configured to acquire shape data representing a shape of a subject based on a plurality of captured images obtained by a plurality of imaging apparatuses capturing the subject in an imaging region, a first determination unit configured to determine a subject position which is a position of the subject in the imaging region, a second determination unit configured to determine a reference position serving as a reference of the position of the subject, and a generation unit configured to generate, based on the shape data acquired by the acquisition unit, a virtual viewpoint image in accordance with a deviation between the subject position determined by the first determination unit and the reference position determined by the second determination unit.

16 Claims, 17 Drawing Sheets

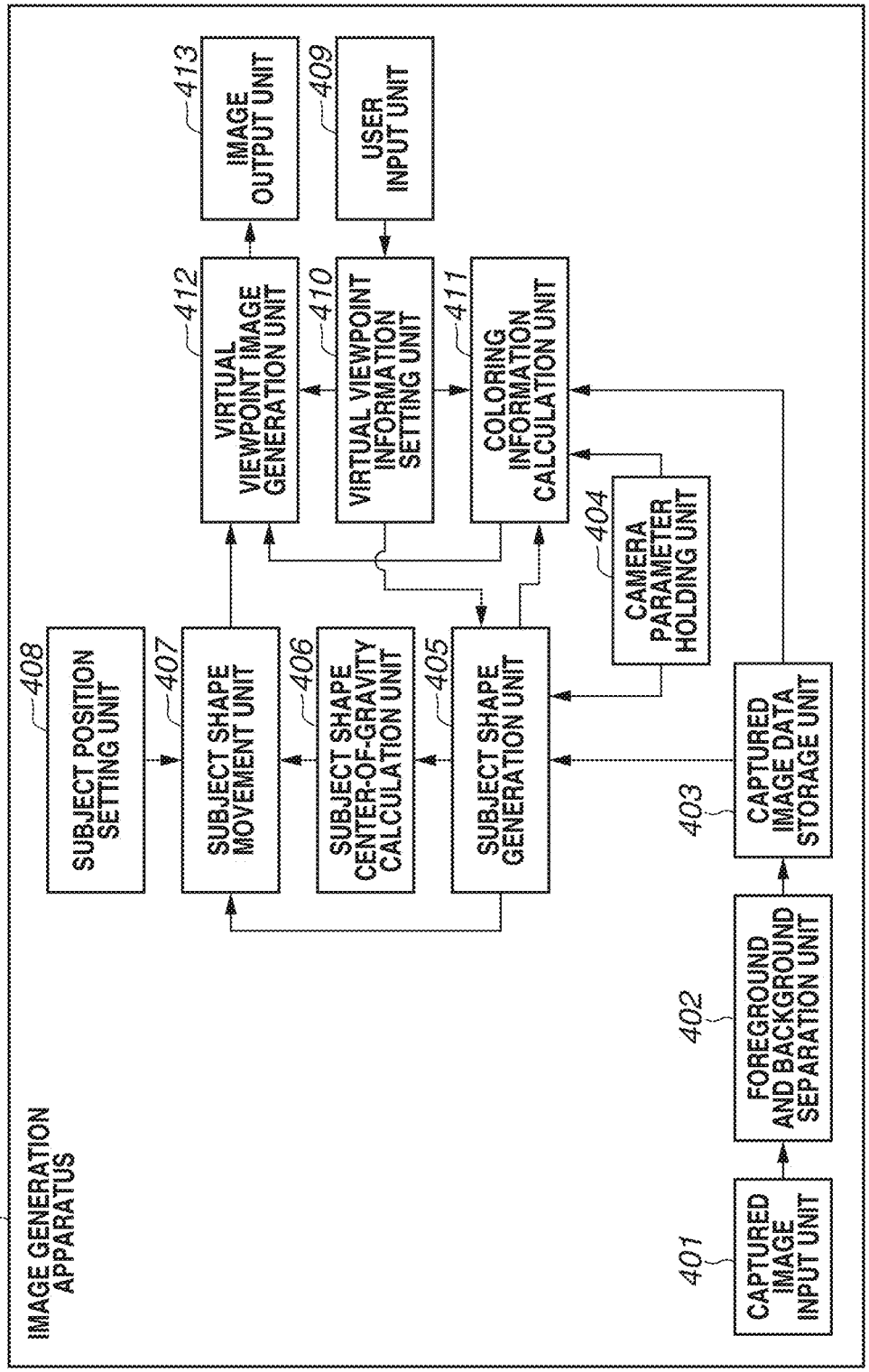

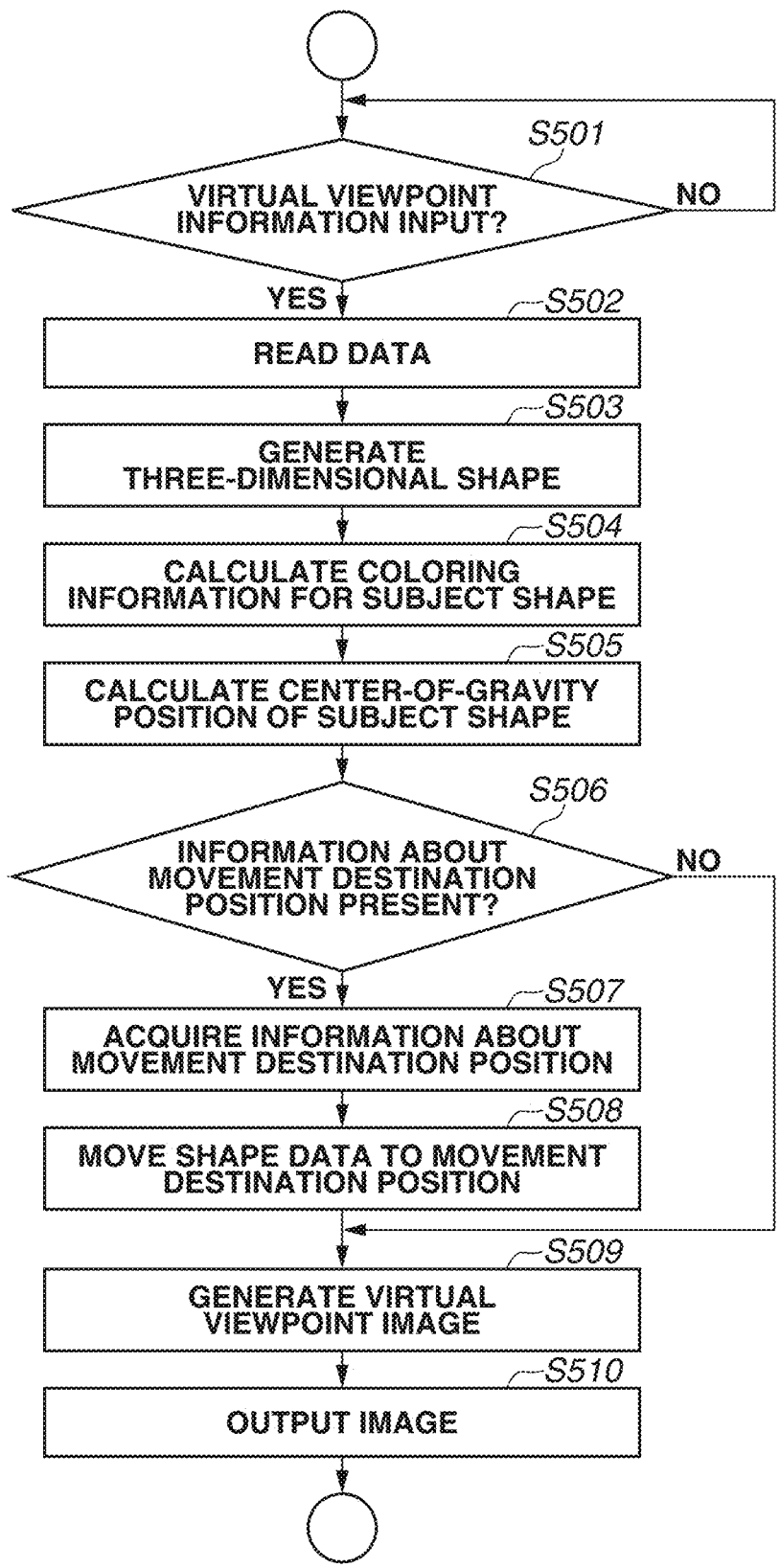

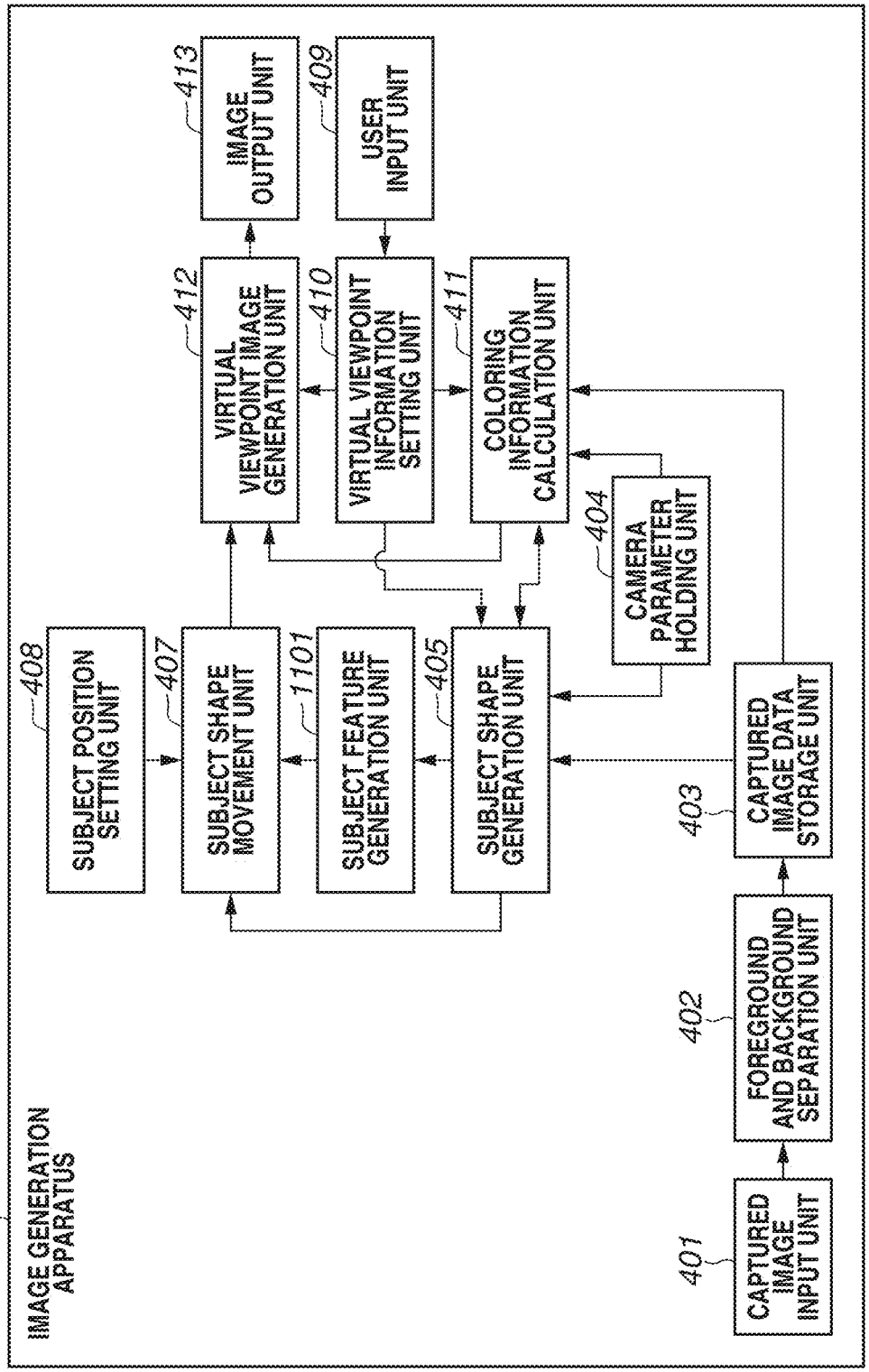

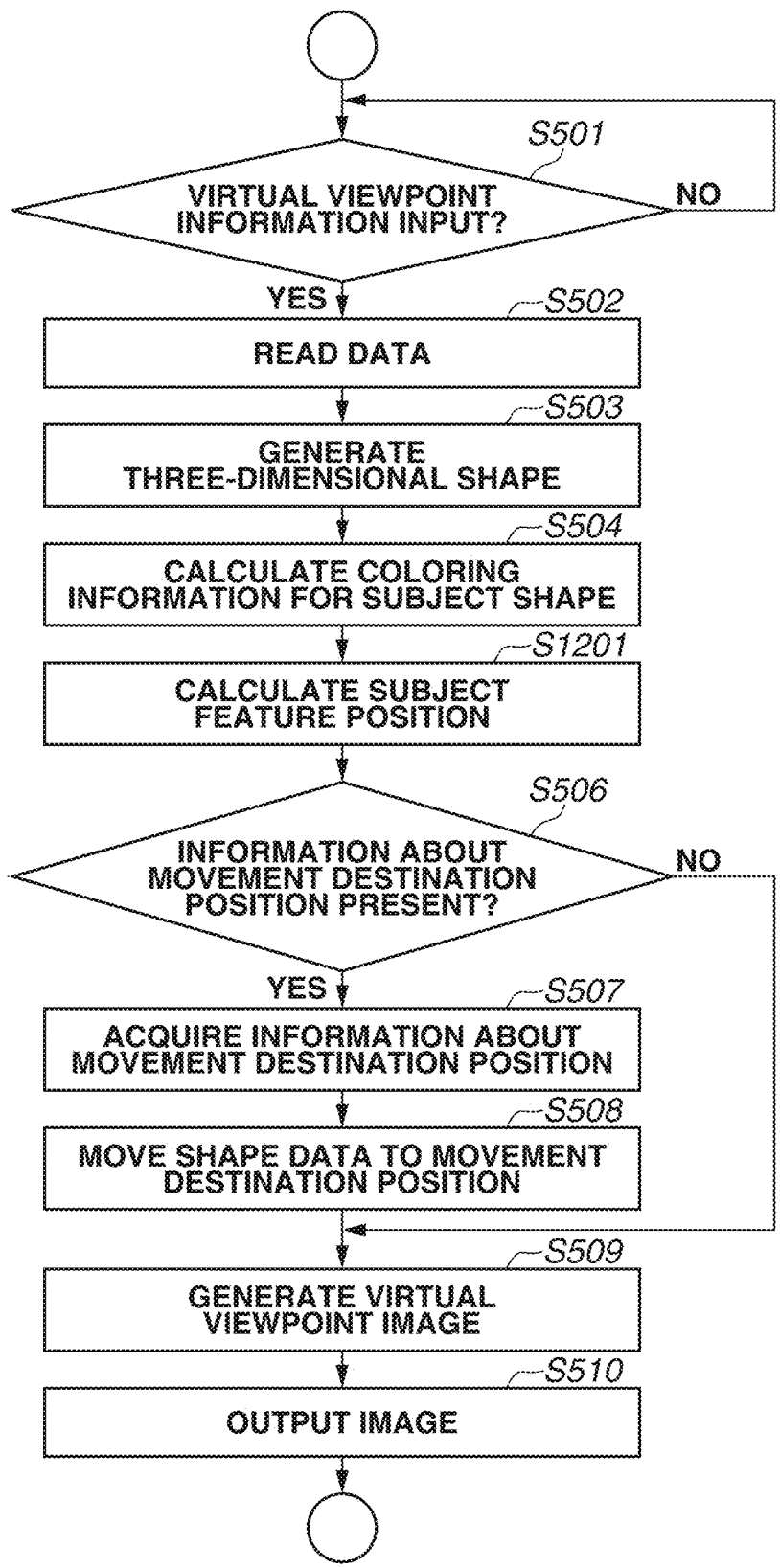

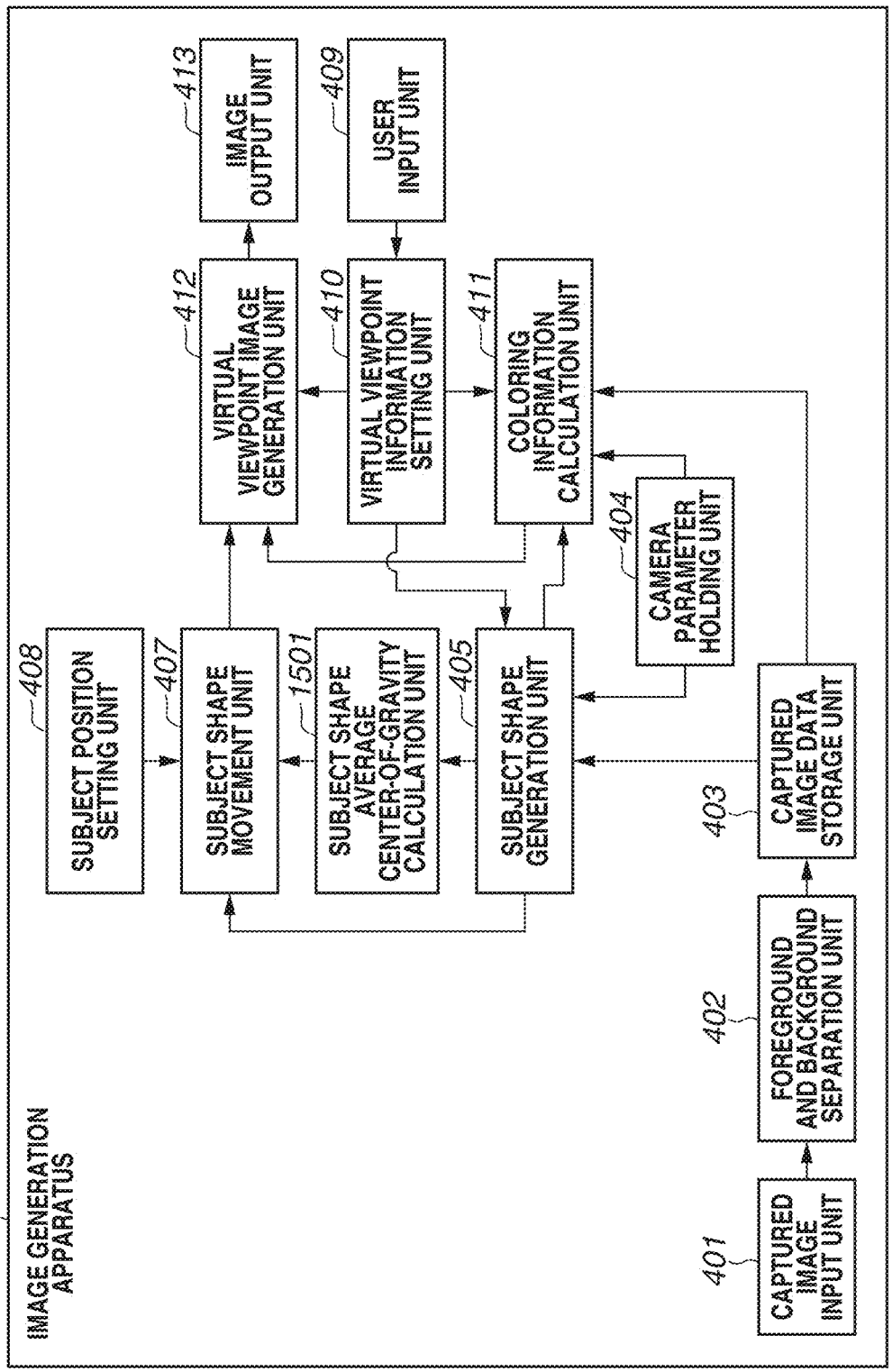

GENERATION APPARATUS, GENERATION METHOD, AND STORAGE MEDIUM

BACKGROUND

Field

The present disclosure relates to a technique for generating a virtual viewpoint image.

Description of the Related Art

Attention has been being given to a technique for generating an image (virtual viewpoint image) viewed from a specified viewpoint (virtual viewpoint) by using a plurality of captured images obtained by a plurality of imaging apparatuses disposed around an imaging region capturing images. This technique enables generation of images such that users are enabled to view sporting events, such as soccer and rugby, concerts, dances, and the like from any viewpoints, thus providing users with high presence.

Japanese Patent Application Laid-Open No. 2008-15756 discusses a technique for generating and displaying any virtual camera images using images of a subject captured by a plurality of cameras disposed around the subject. The technique discussed in Japanese Patent Application Laid-Open No. 2008-15756 makes it possible for a user to view the captured images of dance, performance, and the like of the performer (subject) from various angles in viewing content using the technique for generating a virtual camera image.

However, in dancing and other performances, the position of the performer serving as a subject may be different from the desired position at the time of image capturing. As a result, the position of the performer is different from the desired position in a virtual viewpoint image generated based on captured images.

Even if the position of the subject deviates from the desired position at the time of image capturing, the user may not notice the difference of the position of the subject from the desired position in a virtual viewpoint image, depending on a position of a specified virtual viewpoint.

SUMMARY

The present disclosure has been devised in view of the above-described issue. The present disclosure is directed to generating a virtual viewpoint image that is applicable to a difference between a position of the subject and a desired position.

According an aspect of the present disclosure, a generation apparatus includes an acquisition unit configured to acquire shape data representing a shape of a subject based on a plurality of captured images obtained by a plurality of imaging apparatuses capturing the subject in an imaging region, a first determination unit configured to determine a subject position which is a position of the subject in the imaging region, a second determination unit configured to determine a reference position serving as a reference of the position of the subject, and a generation unit configured to generate, based on the shape data acquired by the acquisition unit, a virtual viewpoint image in accordance with a deviation between the subject position determined by the first determination unit and the reference position determined by the second determination unit.

Further features of the present disclosure will become apparent from the following description of exemplary embodiments with reference to the attached drawings.

BRIEF DESCRIPTION OF THE DRAWINGS

FIG. 4 illustrates a functional configuration of an image generation apparatus according to one or more aspects of the present disclosure.

FIG. 5 is a flowchart illustrating processing performed by the image generation apparatus according to one or more aspects of the present disclosure.

FIG. 8 illustrates a functional configuration of an image generation apparatus according to one or more aspects of the present disclosure.

FIG. 9 is a flowchart illustrating processing performed by the image generation apparatus according to one or more aspects of the present disclosure.

FIG. 11 illustrates a functional configuration of an image generation apparatus according to one or more aspects of the present disclosure.

DESCRIPTION OF THE EMBODIMENTS

Exemplary embodiments of the present disclosure will be described below with reference to the accompanying drawings. Elements according to the following exemplary embodiments are to be considered to be merely examples of exemplary embodiments, and are not intended to limit the present disclosure.

Figure 1:
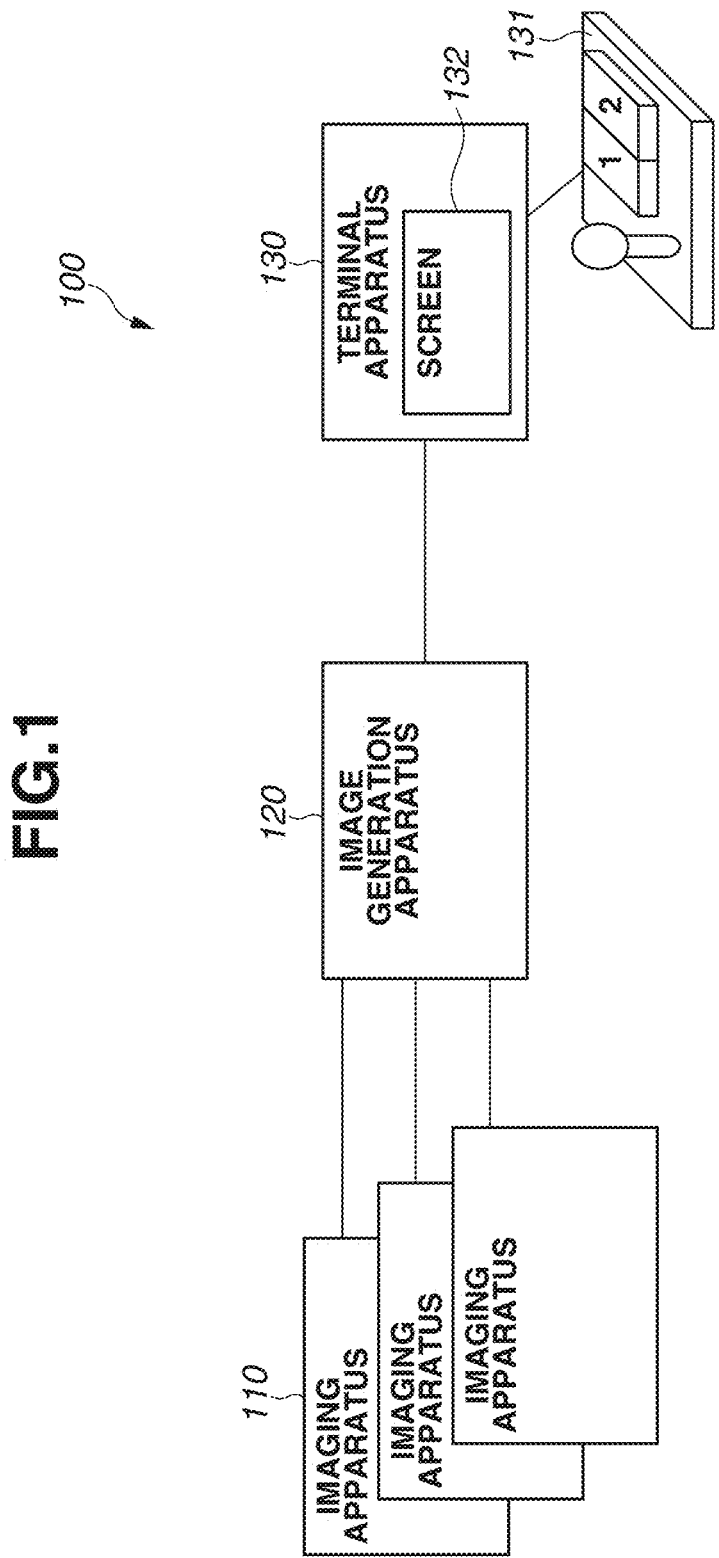
FIG. 1 illustrates a configuration of an image processing system.

A first exemplary embodiment of the present disclosure will be described below. FIG. 1 illustrates an image processing system 100 according to the present exemplary embodiment. The image processing system 100 includes a plurality of imaging apparatuses 110, an image generation apparatus 120, and a terminal apparatus 130.

Each of the imaging apparatuses 110 and the image generation apparatus 120 are connected via a communication cable, such as a Local Area Network (LAN) cable. While, in the present exemplary embodiment, communication cables are LAN cables, the communication cables are not limited to the present exemplary embodiment.

Figure 2:
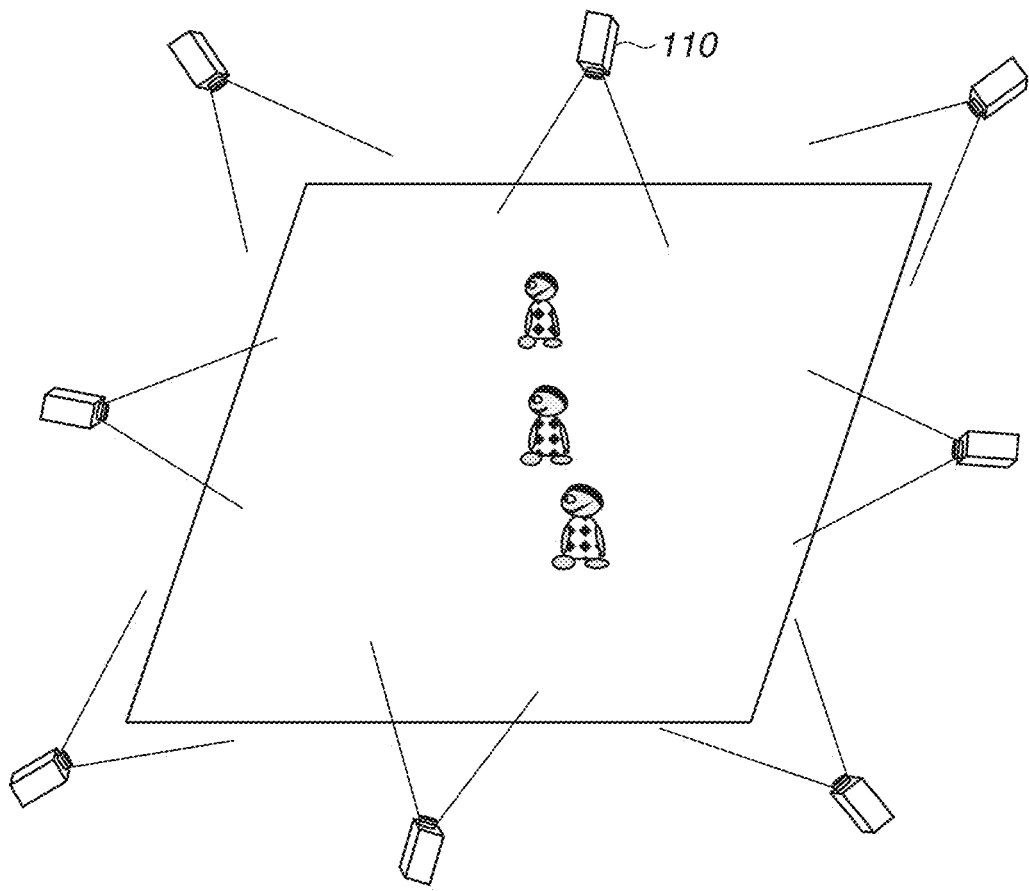
FIG. 2 illustrates an example installation of a plurality of imaging apparatuses.

The imaging apparatuses 110 are digital cameras capable of capturing, for example, images (still images and moving images). The imaging apparatuses 110 are installed to surround an imaging region in, for example, a photographing studio to capture images (video images). The present exemplary embodiment will be described below using an example case for capturing a plurality of performers as subjects in, for example, dance scenes. Captured images are transmitted from the imaging apparatuses 110 to the image generation apparatus 120. FIG. 2 illustrates an example of installation of the imaging apparatuses 110. According to the present exemplary embodiment, a plurality of the imaging apparatuses 110 is assumed to be each installed to capture a part or whole of the inside of a photographing studio. More specifically, the image processing system 100 according to the present exemplary embodiment includes the plurality of the imaging apparatuses 110 to capture subjects from a plurality of directions.

The image generation apparatus 120 accumulates captured images obtained by the imaging apparatuses 110. When virtual viewpoint information and playback time information are input through a user operation performed on the terminal apparatus 130, the image generation apparatus 120 generates a virtual viewpoint image based on the captured images and virtual viewpoints. Herein, the virtual viewpoint information includes information about the position of a virtual viewpoint in a virtual space configured based on captured images and the line-of-sight direction from the virtual viewpoint. The information included in the virtual viewpoint information is not limited thereto. For example, the virtual viewpoint information may include information about the width of the visual field (angle of view) of virtual viewpoints. The virtual viewpoint information may include any one of the position of a virtual viewpoint, the line-of-sight direction from the virtual viewpoint, and the angle of view of the virtual viewpoint. The playback time information is information about time from the time when captured images are started to be recorded. For example, by operating the terminal apparatus 130 (described below) to specify the playback time, the user is able to generate a virtual viewpoint image of the scene corresponding to the playback time specified in the recorded captured images.

The image generation apparatus 120 is, for example, a server apparatus that includes a database function and an image processing function. A database prestores an image of a scene where no subject exists as a background image via the imaging apparatuses 110 before starting actual image capturing. In a scene where subjects exist, the image generation apparatus 120 separates, out of captures images, the regions corresponding to specific objects including persons, such as performers, and tools used by the performers (hereinafter, such specific objects are also referred to as foreground images) through image processing, and stores the regions as foreground images. Specific objects may include objects having a predetermined image pattern, such as stage properties.

Virtual viewpoint images corresponding to the virtual viewpoint information are assumed to be generated based on a background image and specific object images managed by the database. Examples of a method for generating a virtual viewpoint image include Model-Based Rendering (MBR). MBR refers to a method for generating a virtual viewpoint image by using a three-dimensional shape generated based on a plurality of images of a subject captured from a plurality of directions. More specifically, MBR is a technique for generating a view of a scene from a virtual viewpoint as an image. MBR uses a three-dimensional shape (model) of a target scene obtained by a three-dimensional shape reconstruction method, such as the Shape-from-Silhouette method and Multi-View-Stereo (MVS). Rendering techniques other than MBR may be used as a method for generating a virtual viewpoint image. The generated virtual viewpoint image is transmitted to the terminal apparatus 130 via a LAN cable.

The terminal apparatus 130 is, for example, a personal computer (PC) or a tablet computer. Examples of a controller 131 include a mouse, keyboard, 6-axis controller, and touch panel. The user performs operations by using these devices to display a still image and a moving image on the screen. The terminal apparatus 130 displays, for example, a virtual viewpoint image received from the image generation apparatus 120 on a display unit 132. The terminal apparatus 130 further receives the playback time and an instruction to move the virtual viewpoint (an instruction related to the moving amount and moving direction) in response to a user operation performed on the connected controller 131, and then transmits a transmission signal indicating instruction information according to the received instruction to the image generation apparatus 120.

Figure 3:
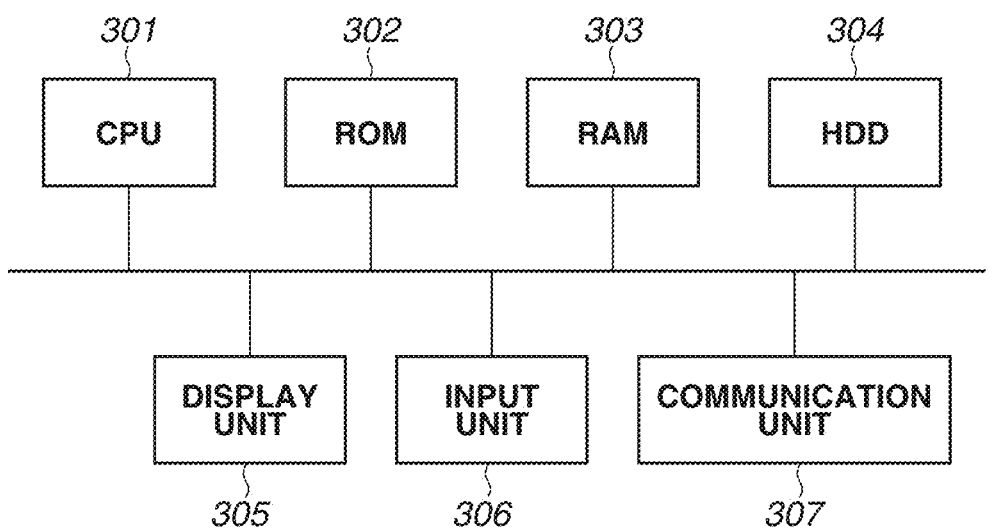
FIG. 3 illustrates a hardware configuration of an image generation apparatus.

FIG. 3 illustrates a hardware configuration of the image generation apparatus 120.

The image generation apparatus 120 includes a central processing unit (CPU) 301, a read only memory (ROM) 302, a random access memory (RAM) 303, a hard disk drive (HDD) 304, a display unit 305, an input unit 306, and a communication unit 307. The CPU 301 reads a control program stored in the ROM 302 and executes various processing. The RAM 303 is used as the main memory of the CPU 301 and a temporary storage area, such as a work area. The HDD 304 stores various types of data and various programs. The display unit 305 displays various information. The input unit 306 has a keyboard and/or a mouse and receives various user operations. The communication unit 307 performs processing of communicating with external apparatuses, such as the imaging apparatuses 110, via a network, such as Ethernet. As another example, the communication unit 307 may wirelessly communicate with an external apparatus.

Although, in the example illustrated in FIG. 3, the HDD 304, the display unit 305, and the input unit 306 are included in the image generation apparatus 120, the present disclosure is not limited thereto. For example, at least either one of the HDD 304, the display unit 305, and the input unit 306 may be configured to be connected outside the image generation apparatus 120 as other apparatuses. The functions and processing of the image generation apparatus 120 (described below) are implemented by the CPU 301 reading a program stored in the ROM 302 or the HDD 304 and then executing this program. The hardware configuration of the terminal apparatus 130 is also similar to the hardware configuration of the image generation apparatus 120.

Figure 16A:
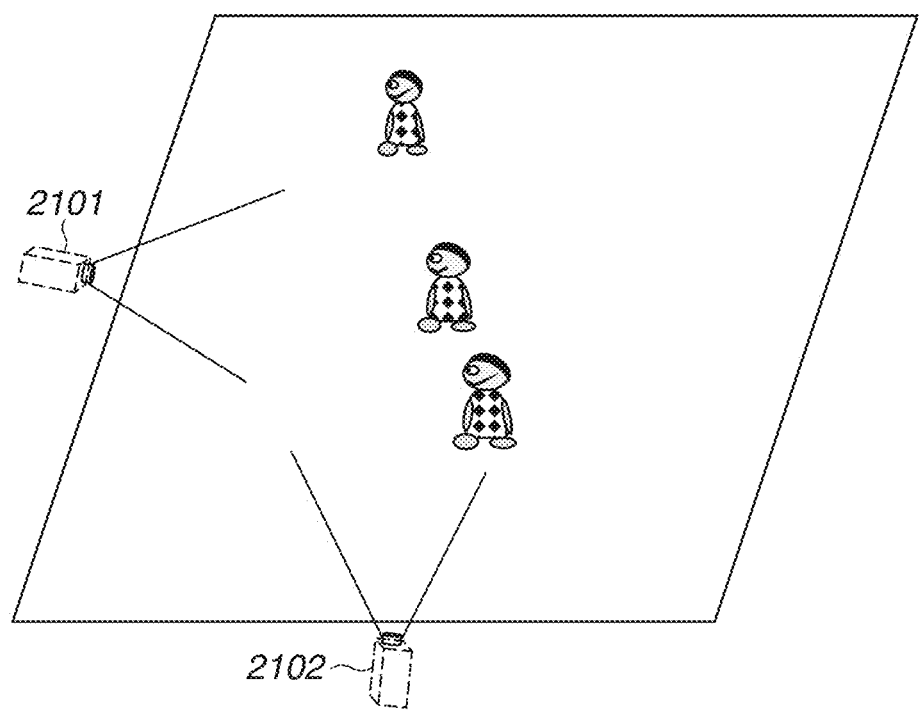
FIGS. 16A to 16C illustrate examples of subjects to be captured and virtual viewpoint images to be generated.
Figure 16B:
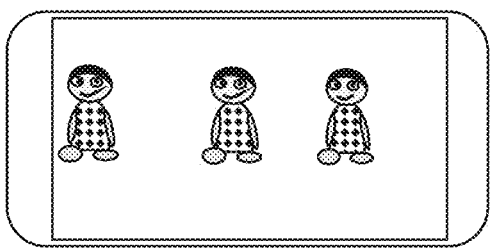
Figure 16C:
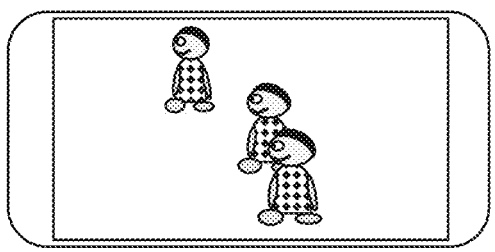

FIG. 4 illustrates a functional configuration of the image generation apparatus 120. Processing which is performed by the image generation apparatus 120 according to the present exemplary embodiment will be described below. The present exemplary embodiment will be described on the assumption that dance scenes are captured and a virtual viewpoint image are generated based on captured images. However, the standing positions of the subjects during dancing may be different from desired standing positions. FIG. 16A is a conceptual view illustrating subjects in the virtual space generated by a plurality of cameras capturing the imaging region surrounded by lines, and virtual cameras corresponding to virtual viewpoints. A virtual camera capable of capturing the subjects from a free angle can be specified. For example, a virtual camera 2101 captures and views the subjects from the front, and a virtual camera 2102 captures and views the subjects from the lateral direction. FIG. 16C illustrates the virtual viewpoint image corresponding to the virtual camera 2102 displayed on the screen. Here, assume that the performers want to perform a play at standing positions to be arranged in a straight line in a case where the performers are captured from the virtual camera 2102. However, the standing positions may possibly deviate in actual image capturing. In a resultant virtual viewpoint image, the standing positions of the subjects may not be aligned in the straight line, as illustrated in FIG. 16C.

There is a conceivable application in which the performers check their standing positions by viewing the virtual viewpoint image. In this case, it may be difficult for the performers to check the deviation of the standing positions depending on a specified virtual camera. FIG. 16B illustrates the virtual viewpoint image corresponding to the virtual camera 2101 displayed on the screen. In the virtual viewpoint image corresponding to the virtual camera 2101, the standing positions of the subjects seem to be aligned. In the virtual viewpoint image captured by the virtual camera 2102, however, the standing positions of the subjects actually deviate. The image generation apparatus 120 according to the present exemplary embodiment is intended to solve the above-described issue.

The image generation apparatus 120 includes a captured image input unit 401, a foreground and background separation unit 402, a captured image data storage unit 403, a camera parameter holding unit 404, a subject shape generation unit 405, a subject shape center-of-gravity calculation unit 406, a subject shape movement unit 407, and a subject position setting unit 408. The image generation apparatus 120 further includes a user input unit 409, a virtual viewpoint information setting unit 410, a coloring information calculation unit 411, a virtual viewpoint image generation unit 412, and an image output unit 413. Each processing unit will be described below.

The captured image input unit 401 converts a transmission signal input from the imaging apparatuses 110 via a LAN cable into captured image data, and outputs the image data to the foreground and background separation unit 402. The foreground and background separation unit 402 outputs the image of a scene where no subject exists, such as a scene pre-captured before the subjects start a performance, out of captured images input from the captured image input unit 401, to the captured image data storage unit 403 as background image data. The foreground and background separation unit 402 then extracts the subjects from images captured during the performance of the subjects, and outputs the subjects to the captured image data storage unit 403 as foreground image data.

The captured image data storage unit 403, which serves as a database, stores an image pre-captured in a state where no subjects exist, out of captured image data input from the foreground and background separation unit 402, in the HDD 304 as background image data. The captured image data storage unit 403 also stores difference data between the background image data and the captured image data where the subjects exist, in the HDD 304 as foreground image data. The captured image data storage unit 403 outputs the foreground image data to the subject shape generation unit 405. The captured image data storage unit 403 also outputs the background and the foreground image data specified by the coloring information calculation unit 411 to the coloring information calculation unit 411.

The camera parameter holding unit 404 holds imaging position information for the plurality of the imaging apparatuses 110, lens focal distances of the imaging apparatuses 110, shutter speeds of the imaging apparatuses 110, and other camera setting information, as camera parameter information. The plurality of the imaging apparatuses 110 is installed at predetermined positions, and the camera parameter information is obtained in advance from the imaging apparatuses 110. The camera parameter holding unit 404 outputs the camera parameter information to the subject shape generation unit 405 and the coloring information calculation unit 411.

The subject shape generation unit 405 generates shape data representing the shapes of the subjects (also referred to as subject shapes) by using the foreground image data and the camera parameter information. The subject shape generation unit 405 generates shape data of the subject, for example, by using a three-dimensional shape reconstruction method such as the Shape-from-Silhouette method. The subject shape generation unit 405 outputs the shape data to the subject shape center-of-gravity calculation unit 406 and the coloring information calculation unit 411.

The subject shape center-of-gravity calculation unit 406 determines the positions of the subjects in the imaging region. More specifically, the subject shape center-of-gravity calculation unit 406 determines the center of gravity of the shapes of the subjects by using the shape data input from the subject shape generation unit 405 to be subject positions. In this case, the subject shape center-of-gravity calculation unit 406 calculates the center-of-gravity positions in a case where the subjects are viewed from a predetermined viewpoint position. For example, the subject shape center-of-gravity calculation unit 406 calculates the center-of-gravity positions viewed from a viewpoint looking down on the subjects from right above, as the positions of the subjects. The subject shape center-of-gravity calculation unit 406 outputs subject center-of-gravity information including the center-of-gravity positions of the subjects to the subject shape movement unit 407.

The subject shape movement unit 407 determines the positions at which the shape data of the subject is to be arranged, based on the subject center-of-gravity information input from the subject shape center-of-gravity calculation unit 406 and subject movement destination position information input from the subject position setting unit 408 (described below). Here, the subject movement destination position information represents the reference positions at which the subjects are to be arranged (hereinafter also referred to as reference positions). The subject shape movement unit 407 determines the arrangement of the shape data according to the deviations between the reference positions and the positions of the subjects.

In a case where the subject movement destination position information is information about grid points set on the floor surface at predetermined intervals (e.g., 3-meter intervals), the subject shape movement unit 407 arranges the shape data of the subject so that grid point positions serving as the reference positions coincide with the center-of-gravity positions of the subjects. The shape data of the subject may be regenerated based on the subject movement destination position information. In a case where the deviations between the reference positions and the positions of the subjects are equal to or larger than a predetermined threshold value, the subject shape movement unit 407 may change the positions of the shape data so that the deviations become smaller than the predetermined threshold value to dispose the shape data at the changed positions. The subject shape movement unit 407 outputs the moved shape data to the virtual viewpoint image generation unit 412.

The subject position setting unit 408 outputs the subject movement destination position information in a three-dimensional space preset by the user to the subject shape movement unit 407. For example, the subject position setting unit 408 outputs grid point information at 3-meter intervals conforming to the floor surface so that a plurality of subjects is arranged at predetermined sections in a predetermined straight line. The subject movement destination position information is not limited to grid points but may be, for example, straight lines or curves.

The user input unit 409 converts a transmission signal input from the terminal apparatus 130 via an LAN cable into user input data. In a case where the user input data includes the playback time information and the virtual viewpoint information, the user input unit 409 outputs the playback time information and the virtual viewpoint information to the virtual viewpoint information setting unit 410.

The virtual viewpoint information setting unit 410 updates the current position and direction in the virtual space and the playback time based on the playback time information and the virtual viewpoint information input from the user input unit 409.

Subsequently, the virtual viewpoint information setting unit 410 outputs the playback time information and the virtual viewpoint information to the subject shape generation unit 405, the coloring information calculation unit 411, and the virtual viewpoint image generation unit 412. The origin point of the virtual space is to be preset to the center of the sports stadium.

The coloring information calculation unit 411 inputs from the captured image data storage unit 403 the foreground and the background image data based on the playback time information and the virtual viewpoint information input from the virtual viewpoint information setting unit 410. The coloring information calculation unit 411 also inputs the camera parameters from the camera parameter holding unit 404, and inputs the shape data from the subject shape generation unit 405. The coloring information calculation unit 411 then subjects the subject shapes viewed from the virtual viewpoint position to rendering (coloring processing) by using the coloring information for image data captured by the actual cameras at the playback time, and holds the coloring information for the subject shapes. For example, in a case where actual camera position information is present within a predetermined range from the virtual viewpoint position in a situation where the subjects based on the shape data can be viewed from the virtual viewpoint, the foreground image data of the actual cameras will be used as the shape color. The coloring information calculation unit 411 also outputs the coloring information to the virtual viewpoint image generation unit 412.

The virtual viewpoint image generation unit 412 inputs from captured image data storage unit 403 the foreground and the background image data based on the playback time information and the virtual viewpoint information input from the virtual viewpoint information setting unit 410. The virtual viewpoint image generation unit 412 also inputs the camera parameters from the camera parameter holding unit 404, and inputs moved shape data from the subject shape movement unit 407. Subsequently, the virtual viewpoint image generation unit 412 subjects the background image data to projection conversion and/or image processing so that the background image can be viewed from the virtual viewpoint position as the background of the virtual viewpoint image. Then, the virtual viewpoint image generation unit 412 further inputs, from coloring information calculation unit 411, the coloring information based on the image data captured by the imaging apparatuses 110 at the playback time for the moved subject shape viewed from the next virtual viewpoint position and perform rendering (coloring processing) based on the coloring information to generate a virtual viewpoint image. Lastly, the virtual viewpoint image generation unit 412 outputs the generated virtual viewpoint image to the image output unit 413. The image output unit 413 converts the image data input from the virtual viewpoint image generation unit 412 into a transmission signal transmittable to the terminal apparatus 130, and then outputs the signal to the terminal apparatus 130.

Operations of the image generation apparatus 120 will be described below. FIG. 5 is a flowchart illustrating operations of the image generation apparatus 120 according to the first exemplary embodiment. The following processing is performed by the CPU 301 reading a program stored in the ROM 302 or HDD 304 and then executing the program. Processing is started in response to an input for specifying the virtual viewpoint information and the playback time from the terminal apparatus 130.

In step S501, the virtual viewpoint information setting unit 410 determines whether the virtual viewpoint information and the playback time information have been input via the user input unit 409. When the virtual viewpoint information and/or the playback time information has not been input (NO in step S501), the processing repeats step S501. If the virtual viewpoint information and the playback time information have been input (YES in step S501), the processing proceeds to step S502. In step S502, the virtual viewpoint information setting unit 410 outputs the virtual viewpoint information and the playback time information to the subject shape generation unit 405, the coloring information calculation unit 411, and the virtual viewpoint image generation unit 412.

In step S502, the subject shape generation unit 405 reads the foreground image data input from the captured image data storage unit 403 based on the playback time information input from the virtual viewpoint information setting unit 410, and the camera parameter information input from the camera parameter holding unit 404. Next in step S503, the subject shape generation unit 405 estimates the three-dimensional shapes of the subjects. For example, the subject shape generation unit 405 generates shape data of the subject by using a three-dimensional shape reconstruction method, such as the Shape-from-Silhouette method. The shape data is assumed to include a plurality of point groups, and each point includes position information.

The coloring information calculation unit 411 then inputs from the captured image data storage unit 403 the foreground and the background image data based on the playback time information and the virtual viewpoint information input from the virtual viewpoint information setting unit 410. The coloring information calculation unit 411 also inputs the camera parameters from the camera parameter holding unit 404, and inputs the shape data from the subject shape generation unit 405. In step S504, the coloring information calculation unit 411 subjects the subject shapes viewed from the virtual viewpoint position to rendering (coloring processing) by using the coloring information for image data captured by the actual cameras at the playback time, and holds the coloring information for the subject shapes.

Figure 6C:
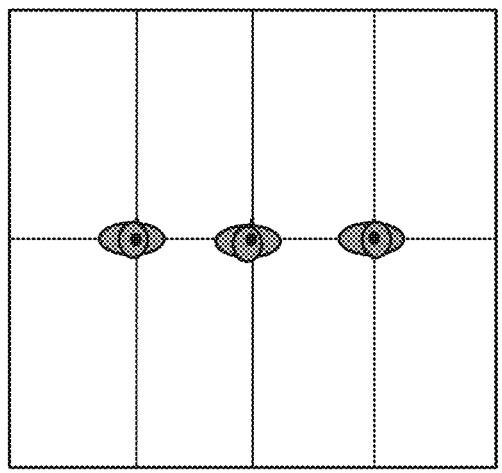
FIGS. 6A to 6C illustrate example arrangements of shape data of a subject according to one or more aspects of the present disclosure.
Figure 6B:
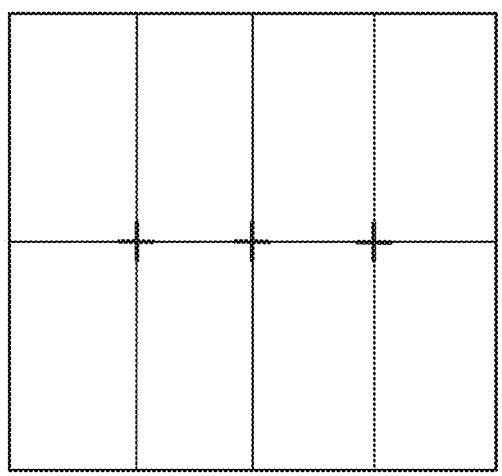
Figure 6A:
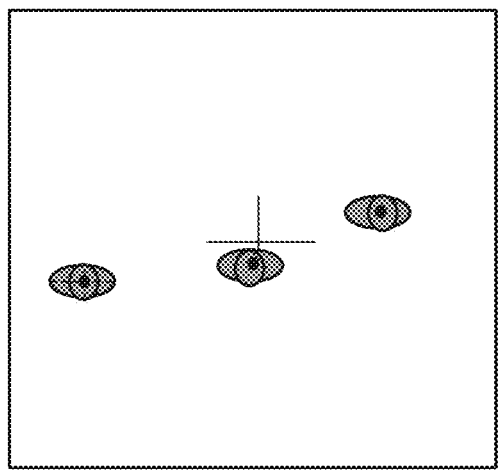

Next in step S505, the subject shape center-of-gravity calculation unit 406 determines, to be subject positions, the center-of-gravity positions of the subject shapes input from the subject shape generation unit 405 viewed from the predetermined viewpoint position. According to the exemplary embodiments, the center-of-gravity positions viewed from the right above are referred to as subject shape center-of-gravity information. FIG. 6A is a conceptual view illustrating shape data of the subject viewed from right above and the center-of-gravity positions of the shape data. According to the present exemplary embodiment, to rearrange a plurality of subjects on the predetermined grid points, the subject shape center-of-gravity calculation unit 406 calculates the center positions of each subject, in the anteroposterior axis and in the lateral axis, when viewed from a viewpoint looking down on the subject from right above, thus calculating the center-of-gravity positions of the subjects. The center-of-gravity position of each subject is marked with a black point and is arranged in a straight line or a grid point.

Referring back to FIG. 5, in step S506, the subject shape movement unit 407 determines whether the subject movement destination position information in the three-dimensional space, which is input by the subject position setting unit 408, is present. If the subject shape movement unit 407 determines that the subject movement destination position information in the three-dimensional space, which is input by the subject position setting unit 408, is present via the subject position setting unit 408 (YES in step S506), the processing proceeds to step S507. In step S507, the subject shape movement unit 407 acquires the subject movement destination position information. If the subject shape movement unit 407 determines that the subject movement destination position information in the three-dimensional space is not present (NO in step S506), the processing proceeds to step S509. FIG. 6B is a conceptual view illustrating the grid point positions, on the floor surface, representing the reference positions of the subjects based on the subject movement destination position information. For example, the subject position setting unit 408 outputs the grid point information at 3-meter intervals conforming to the floor surface so that the plurality of subjects is arranged at predetermined sections in a predetermined straight line.

Referring back to FIG. 5 again, in step S508, the subject shape movement unit 407 moves the shape data based on the subject center-of-gravity information input from the subject shape center-of-gravity calculation unit 406 and the subject movement destination position information input from the subject position setting unit 408. FIG. 6C is a conceptual view illustrating the subject shape after the subject movement. FIG. 6C illustrates that the subject positions have been changed so that the grid point positions based on the subject movement destination position information coincide with the center-of-gravity positions of the subject shapes when viewed from a viewpoint looking down on the subject shapes, and the shape data has been moved to the changed subject positions. Thus, the positions of the moved subject shapes have been moved so that a constant distance is maintained between the subjects. Here, the subject positions may be changed so that the deviations between the reference positions and the subject positions become smaller than a predetermined threshold value, and the shape data may be arranged.

Referring back to FIG. 5, in step S509, the virtual viewpoint image generation unit 412 performs rendering (coloring processing) on the shape data viewed from the virtual viewpoint position based on the moved shape data by using the image data captured by the imaging apparatuses 110 at specified time, to generate a virtual viewpoint image. More specifically, by performing rendering on the coloring information for the subjects determined and held before the subject movement after the subject movement, the subjects are displayed at the moved positions. In step S510, the virtual viewpoint image generation unit 412 outputs the virtual viewpoint image generated by the virtual viewpoint image generation unit 412 to the image output unit 413. The above-described processing can be performed based on recorded and accumulated image data, or performed in real time in parallel with the image capturing by the imaging apparatuses 110.

While, in the descriptions in conjunction with FIG. 5, the coloring information for the subjects determined and held before the subject movement is subjected to rendering after the subject movement, the present disclosure is not limited thereto. For example, a target subject is moved to a specified position and, at the same time, the imaging positions of all of the imaging apparatuses 110 and the positions of subjects other than the target subject are relatively moved so as to maintain the positional relation with the target subject. Then, only the target subject is subjected to rendering. This processing may be sequentially performed on each subject to combine images to generate a virtual viewpoint image. More specifically, instead of determining the coloring information before the subject movement, the calculation and rendering of the coloring information may be performed after the movement of the subject.

Figure 7A:
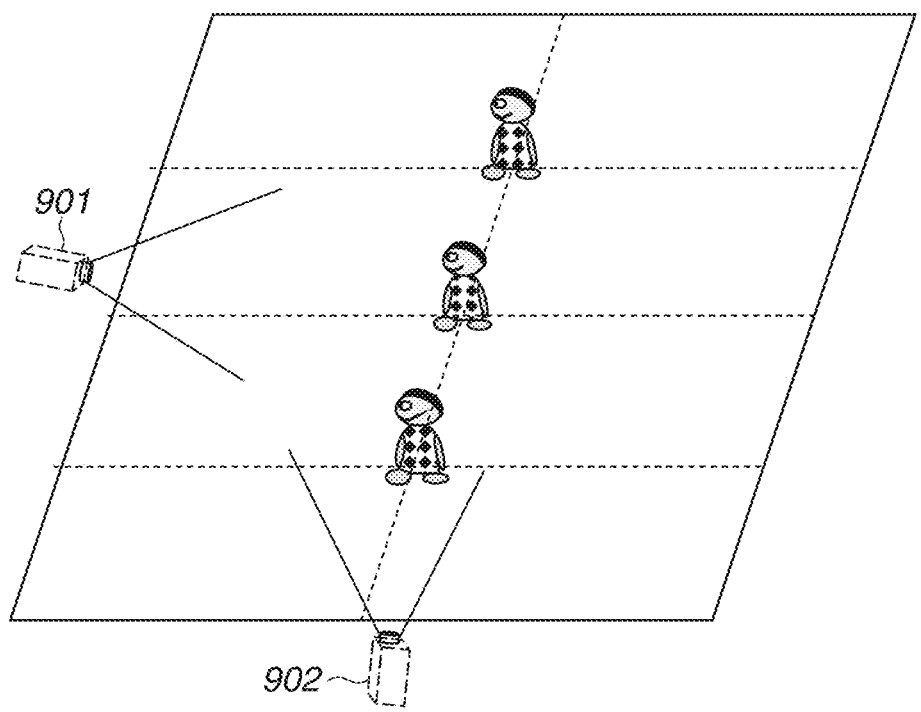
FIGS. 7A to 7C illustrate examples of generated virtual viewpoint images according to one or more aspects of the present disclosure.
Figure 7B:
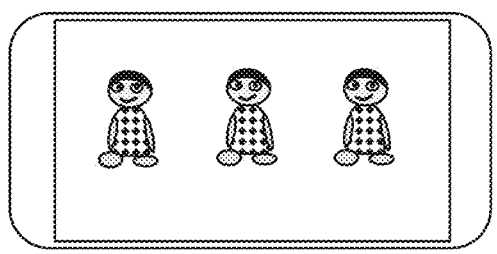
Figure 7C:
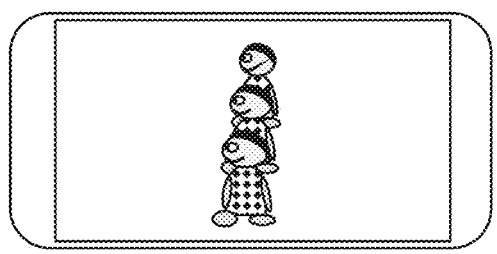

FIGS. 7A to 7C illustrate virtual viewpoint images generated by performing the processing illustrated in FIG. 5 in a case where the subjects illustrated in FIG. 16A are captured. FIG. 7A illustrates the positions of the shape data of the subject in the three-dimensional space corresponding to the imaging region. Referring to FIG. 7A, the plurality of subjects is moved to predetermined grid point positions different from the positions during the performance even while the subjects are performing a play such as dancing, and the subjects performing the same action at standing positions while keeping constant distances are captured by the virtual cameras. Even if the subjects are captured from the position of a virtual camera 901 or from the position of a virtual camera 902, the standing positions are different from the standing positions at which the subjects are actually performing a play, such as dancing.

FIG. 7B illustrates a display example of a virtual viewpoint image corresponding to the virtual camera 901 displayed on the terminal apparatus 130. Even if the subjects are captured from the front, the subjects are enabled to perform a play while being constantly kept staying at certain positions. FIG. 7C illustrates an example of a virtual viewpoint image corresponding to the virtual camera 902 displayed on the terminal apparatus 130. Since the subjects can be linearly rearranged and displayed even while being captured from the lateral direction, the subjects are enabled to constantly perform a play at the same positions.

As described above, in capturing a plurality of subjects by using a plurality of cameras and then capturing and displaying a virtual viewpoint, the first exemplary embodiment enables generation of a virtual viewpoint image with the subjects rearranged at desired positions. In comparison with the time of capturing the performance, the image of the virtual cameras enables the viewing of the subjects performing a play in an aligned way. While, in the above-described example, the reference positions are represented by grid points, the reference positions may be represented by predetermined straight lines or curves. In this case, if any positions of the subjects deviates from a straight line, the shape data is arranged so that the position of the subject coincides with the position of a certain point in the line (e.g., the point in the line closest to the current subject position). Each reference position may be a point (coordinates) at a certain position. If a plurality of subjects exists in this case, the point of the reference position may be set for each subject.

Reference positions may be determined based on the subject positions of the plurality of subjects. For example, when three persons are captured as subjects, standing positions are to be set so that the three subjects are positioned in a straight line. In this case, a straight line connecting two out of three subject positions is calculated, and the position of the remaining subject is changed by using a point in the calculated straight line as the reference position. This enables the generation of a virtual viewpoint image in which the shape data is arranged so that the three subjects are positioned in the straight line. This also applies to a case where the number of subjects is other than three.

Figure 17:
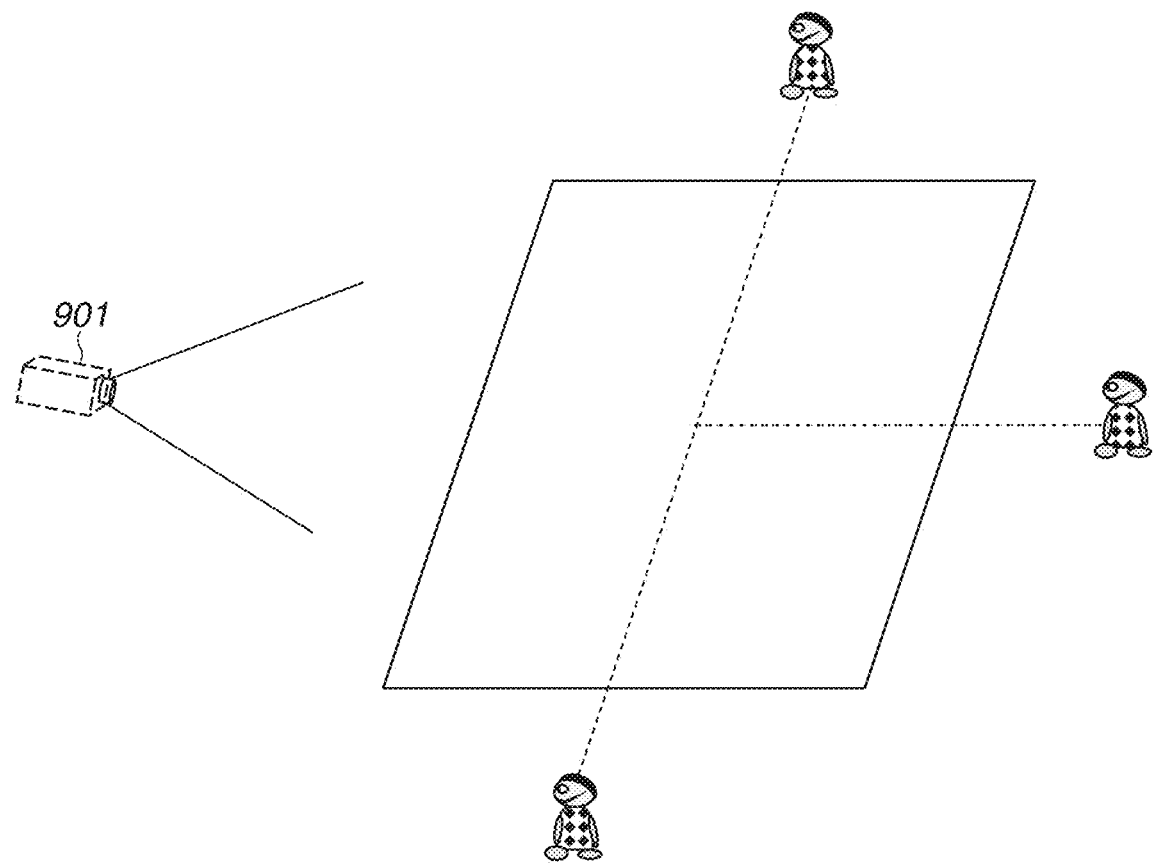
FIG. 17 illustrates an example arrangement of shape data of the subject outside an imaging region according to one or more aspects of the present disclosure.

Reference position setting is not limited to a case where subjects are arranged at positions in the three-dimensional space corresponding to the imaging region as illustrated in FIG. 7A. Reference positions may be set at positions in any three-dimensional space outside the imaging region. FIG. 17 illustrates an example where the shape data of the subject is arranged at positions in a three-dimensional space outside the imaging region. In the example illustrated in FIG. 17, reference positions for moving the target shape data of the subject are set at positions outside the imaging region. Referring to FIG. 17, even in a case where a plurality of subjects is actually captured during the performance, such as dancing, within the imaging region, the subjects are captured from the position of the virtual camera 901 in such a way that as if the subjects are performing, such as dancing, in a region wider than the imaging region.

A second exemplary embodiment of the present disclosure will be described below. In the present exemplary embodiment, a description will be provided of an example of a method for changing the position of a subject based on a predetermined feature of the subject. FIG. 8 illustrates a functional configuration of an image generation apparatus 1100 according to the second exemplary embodiment. The image generation apparatus 1100 includes a subject feature generation unit 1101 instead of the subject shape center-of-gravity calculation unit 406 of the image generation apparatus 120 according to the first exemplary embodiment illustrated in FIG. 4. The hardware configuration of the image generation apparatus 1100 is similar to that of the image generation apparatus 120 according to the first exemplary embodiment. Elements having a similar configuration to those of the image generation apparatus 120 are assigned the same reference numerals, and redundant descriptions thereof will be omitted.

The subject feature generation unit 1101 performs predetermined feature recognition on a subject and calculates its position based on the shape data input from the subject shape generation unit 405 and the coloring information corresponding to the shape data. For example, in a case where a plurality of subjects is rearranged on straight lines or predetermined grid points on the floor surface by using the faces of the plurality of subjects as features, the subject feature generation unit 1101 performs facial recognition on the subjects by using the shape data and the coloring information to determine the facial positions. Thus, the shape data is arranged in the subsequent processing so that the facial positions coincide with predetermined straight lines or grid points when viewed from a viewpoint looking down on the facial positions from right above. More specifically, the subject feature generation unit 1101 determines a predetermined portion of the shape of the subject to be the subject positions. The subject feature generation unit 1101 outputs subject feature position information to the subject shape movement unit 407.

FIG. 9 is a flowchart illustrating image processing performed by the image generation apparatus 1100 according to the second exemplary embodiment. The operations in steps S501 to S504 are similar to those in FIG. 5, and redundant descriptions thereof will be omitted. Also, the operations in steps S506 to S510 are similar to those in FIG. 5, and redundant descriptions thereof will be omitted.

In step S1201, the subject shape generation unit 405 determines the positions of a predetermined portion to be the subject positions. In this case, the subject shape generation unit 405 determines the positions having a predetermined feature out of the shape data of the subject by using, for example, image analysis such as facial recognition.

Figure 10A:
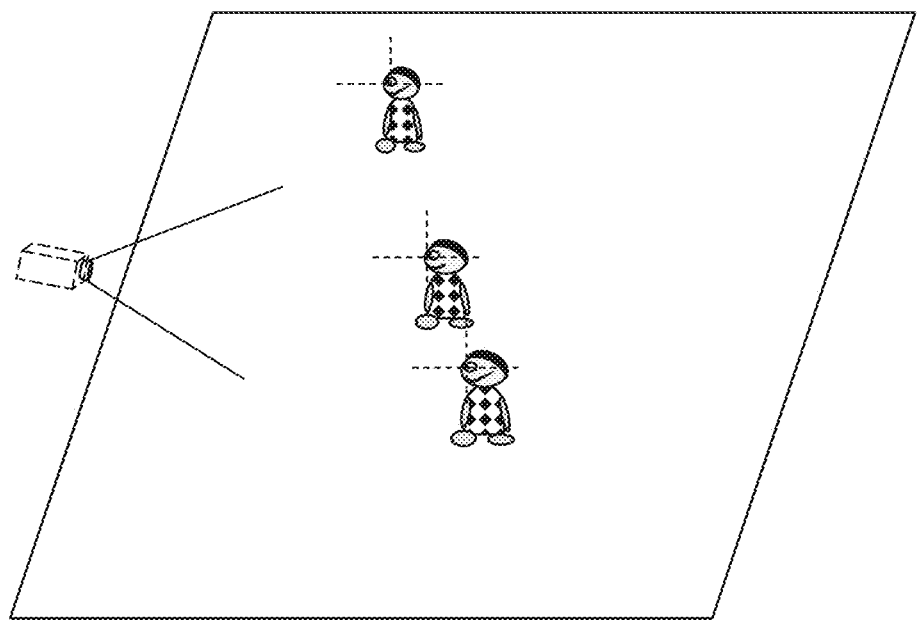
FIGS. 10A and 10B illustrate example arrangements of shape data of the subject according to one or more aspects of the present disclosure.
Figure 10B:
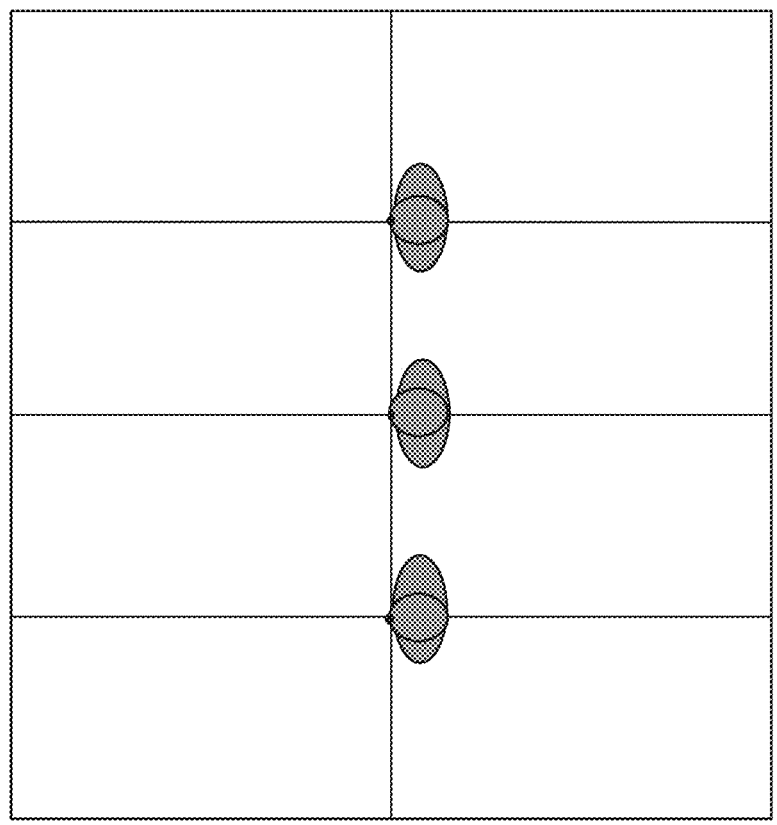

FIGS. 10A and 10B illustrate examples of a case where the face of each subject is analyzed using the shape data and the coloring information to determine the facial position to be the subject position. The subject feature generation unit 1101 determines the facial positions of the subjects, as illustrated in FIG. 10A. Further, the subject shape movement unit 407 arranges the shape data based on the subject positions determined by the subject feature generation unit 1101. Thus, as illustrated in FIG. 10B, the shape data is arranged so that the facial positions coincide with grid points when viewed from above.

In subject feature recognition (e.g., facial recognition) and subject position determination, a feature (face) is extracted from a plurality of captured images obtained by the imaging apparatuses 110, and then the feature position (a position in the three-dimensional space) is calculated based on the camera parameter information. However, the present disclosure is not limited thereto. For example, a virtual viewpoint image may be generated by using virtual cameras set at predetermined positions, and then feature recognition and position determination may be performed by using the generated virtual viewpoint image.

As discussed above, the image generation apparatus 1100 according to the present exemplary embodiment determines the position of a predetermined portion of each subject and arranges the shape data according to the deviation between the determined position and the reference position to generate a virtual viewpoint image. The predetermined portion is not limited to the face but may be a hand, leg, or shoe. Thus, in a case where shoes for a commercial message (CM) are imaged, for example, it is possible to discern the feature of the shoes and arrange the shape data so that the shoes position coincides with the reference position or the deviation between the two positions is smaller than a predetermined threshold value. This enables generation of a virtual viewpoint image in which the shoes are positioned at a desired position.

A third exemplary embodiment of the present disclosure will be described. In the present exemplary embodiment, a description will be provided of an example of a method of changing the positions of the subjects based on the center-of-gravity positions of the subjects in the time-axis direction. FIG. 11 illustrates a functional configuration of an image generation apparatus 1500 according to the third exemplary embodiment. The image generation apparatus 1500 includes a subject shape average center-of-gravity calculation unit 1601 instead of the subject shape center-of-gravity calculation unit 406 of the image generation apparatus 120 according to the first exemplary embodiment illustrated in FIG. 4. The hardware configuration of image generation apparatus 1500 according to the third exemplary embodiment is similar to that according to the above-described exemplary embodiments. Similar functional configurations are assigned the same reference numerals, and redundant descriptions thereof will be omitted.

The subject shape average center-of-gravity calculation unit 1501 calculates the center-of-gravity positions of the subjects in each of moving image frames of the captured image obtained by the imaging apparatuses 110. For example, in a case where a 10-minute dance scene is captured, the subject shape average center-of-gravity calculation unit 1501 determines the center-of-gravity positions viewed from a viewpoint looking down on the subjects from right above in each frame, and further calculates the average center-of-gravity positions in each moving image frame. The subject shape average center-of-gravity calculation unit 1501 sets the calculated average center-of-gravity positions as the subject positions, and outputs information about the average positions to the subject shape movement unit 407.

Figure 12:
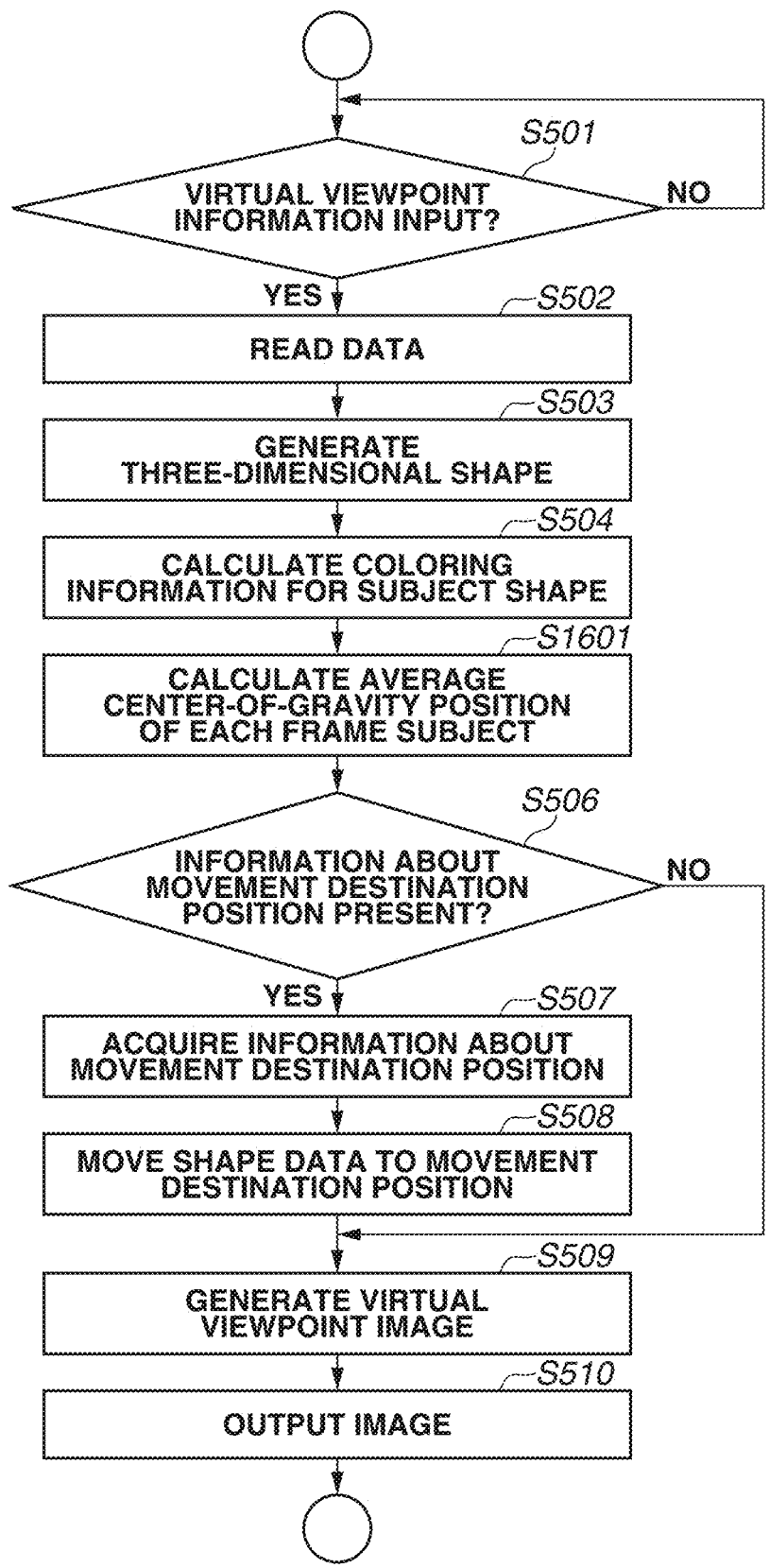
FIG. 12 is a flowchart illustrating processing performed by the image generation apparatus according to one or more aspects of the present disclosure.

FIG. 12 is a flowchart illustrating image processing performed by the image generation apparatus 1500 according to the third exemplary embodiment. Of the processing illustrated in FIG. 12, redundant descriptions of the processing equivalent to that illustrated in FIG. 5 will be omitted.

After completion of the processing in step S504, the subject shape average center-of-gravity calculation unit 1501 calculates the center-of-gravity positions viewed from the predetermined viewpoint position of the subject shapes in a plurality of imaging frames input from the subject shape generation unit 405. In step S1601, the subject shape average center-of-gravity calculation unit 1501 calculates the average center-of-gravity positions based on the centers of gravity of the subjects in each moving image frame, and outputs information about the average positions to the subject shape movement unit 407.

Figure 13A:
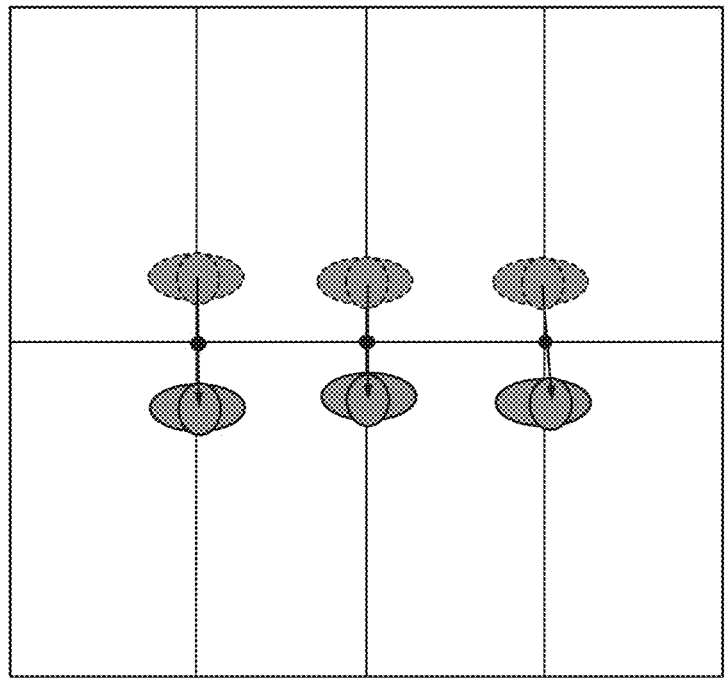
FIGS. 13A and 13B illustrate example arrangements of shape data of the subject according to one or more aspects of the present disclosure.
Figure 13B:
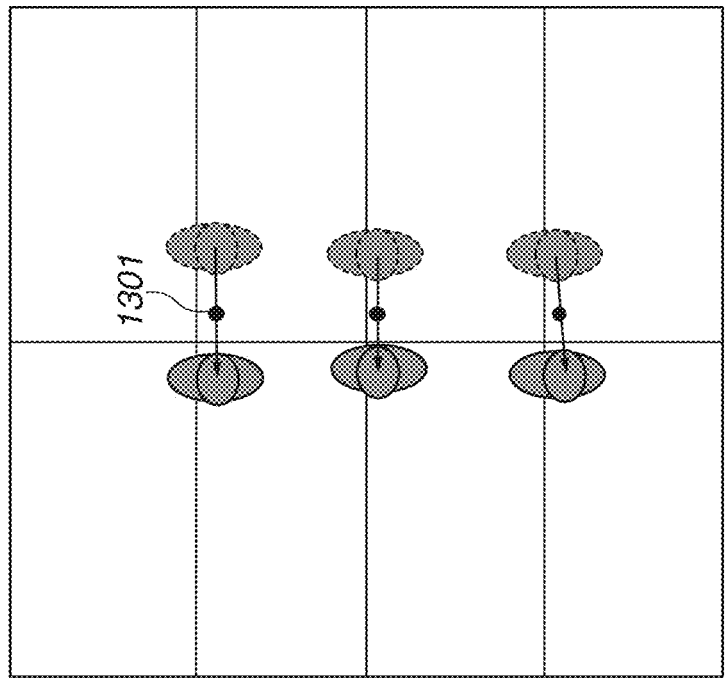

FIGS. 13A to 13B illustrate the average center-of-gravity positions of the subjects. For example, the subjects move in the direction of the arrows illustrated in FIG. 13A in a series of dance scenes. In this case, the center-of-gravity positions of the subjects are calculated in a frame at the time before the subject movement during the performance of the subjects, and in a frame at the time after the subject movement during the performance. Further, the average center-of-gravity positions in each frame are calculated. Referring to FIG. 13A, a point 1301 is determined to be the average center-of-gravity position.

FIG. 13B illustrates a case where the average center-of-gravity positions are moved based on the reference positions. When viewed from a viewpoint looking down on the subjects from right above, the shape data is arranged so that the average center-of-gravity positions of the subjects coincide with the grid point positions based on the subject movement destination position information. Thus, during a series of image capturing, the positions of the subjects are arranged at constant positions on average and move around the positions.

According to the present exemplary embodiment, by calculating the average center-of-gravity positions of the subjects for the imaging time and rearranging the subjects on a predetermined viewpoint, the rearrangement of the subject can be performed without awkwardness even during a series of scene transitions. While, in the exemplary embodiment, the average center-of-gravity positions are calculated, the present disclosure is not limited thereto. The center-of-gravity positions of the subjects in any imaging frame can be used as basic positions. For example, the center-of-gravity positions of the subjects in the frame at the start of imaging can be rearranged according to the grid point position on the floor surface, or the center-of-gravity positions of the subjects in the frame immediately before the end of imaging may be used. Although, in the present exemplary embodiment, the centers of gravity of the subjects are determined, and the average center-of-gravity positions are used as the subject positions, the present disclosure is not limited thereto. For example, the position of a predetermined portion according to the second exemplary embodiment may be determined, and the average position of each subject may be set as the subject position.

Figure 14:
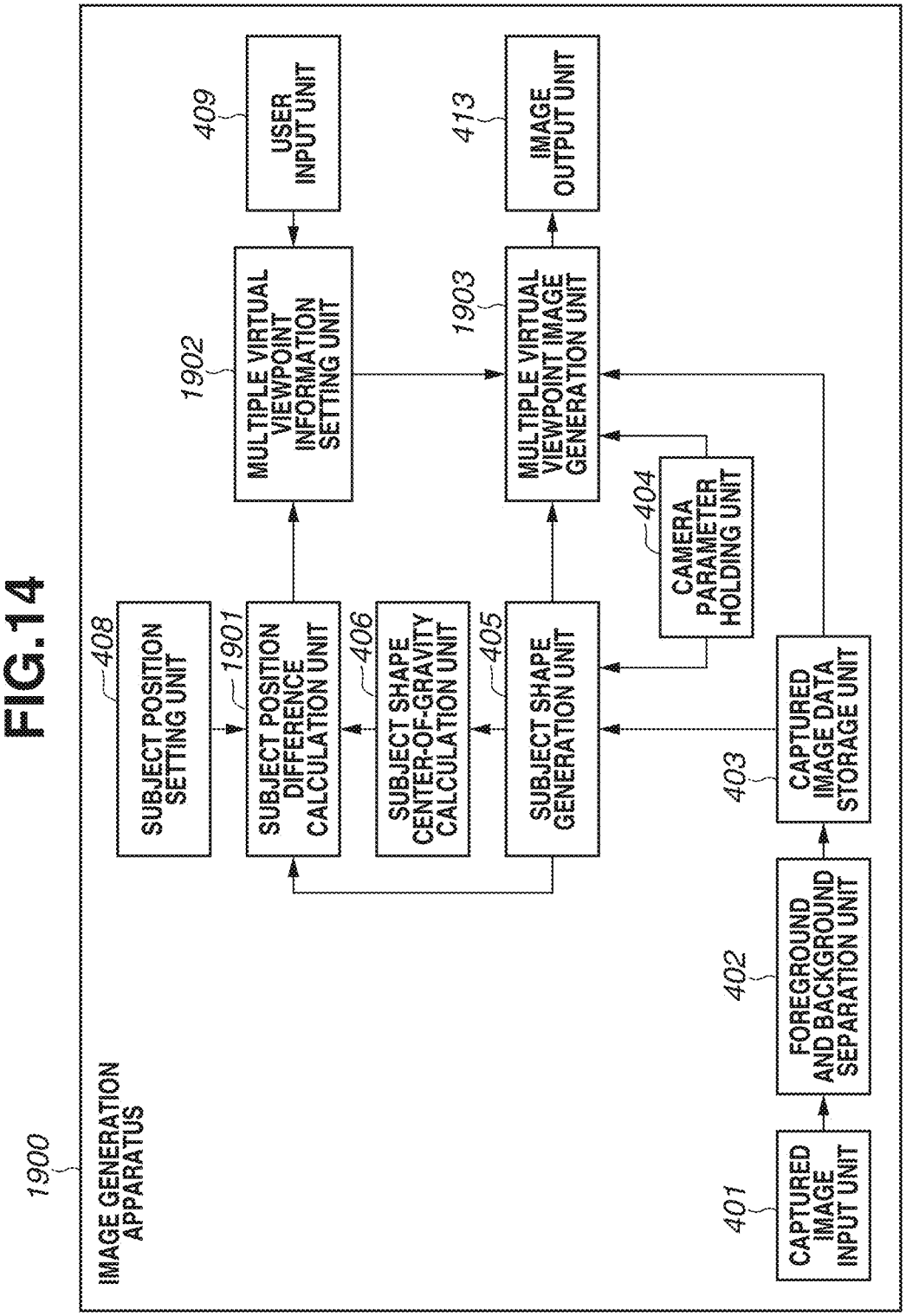
FIG. 14 illustrates a functional configuration of an image generation apparatus according to one or more aspects of the present disclosure.

A fourth exemplary embodiment of the present disclosure will be described below. In the present exemplary embodiment, a description will be provided of a method of capturing each subject while relatively moving the virtual cameras based on the positional relation before and after the subject movement instead of moving the subject, and then combines captured images with the virtual camera image before the subject movement. FIG. 14 illustrates an imaging generation apparatus 1900 according to the fourth exemplary embodiment, which includes a subject position difference calculation unit 1901, a multiple virtual viewpoint information setting unit 1902, and a multiple virtual viewpoint image generation unit 1903. The hardware configuration of the image generation apparatus 1100 is similar to that according to the above-described exemplary embodiments. Elements having a similar configuration to those according to the above-described exemplary embodiments are assigned the same reference numerals, and redundant descriptions thereof will be omitted.

The subject position difference calculation unit 1901 acquires the subject center-of-gravity information from the subject shape center-of-gravity calculation unit 406. The subject position difference calculation unit 1901 also acquires the information about the reference positions of the subjects from the subject position setting unit 408 and calculates differences between the reference positions and the center-of-gravity positions of the subjects.

The multiple virtual viewpoint information setting unit 1902 updates the current position and direction in the virtual space and the playback time based on the playback time information and the virtual viewpoint information input from the user input unit 409, and outputs the playback time information and the virtual viewpoint information to the multiple virtual viewpoint image generation unit 1903. In a case where the multiple virtual viewpoint information setting unit 1902 inputs the positional relation between the subject positions before and after the movement of the subjects from the subject position difference calculation unit 1901 as subject difference information, the multiple virtual viewpoint information setting unit 1902 generates difference virtual viewpoint information based on the subject difference information.

The multiple virtual viewpoint image generation unit 1903 inputs from captured image data storage unit 403 the foreground and the background image data based on the playback time information and the virtual viewpoint information input from the multiple virtual viewpoint information setting unit 1902. The multiple virtual viewpoint image generation unit 1903 also inputs the camera parameters from the camera parameter holding unit 404, and inputs the shape data of the object to be moved from the subject shape generation unit 405. Subsequently, the multiple virtual viewpoint image generation unit 1903 subjects the background image data to projection conversion and image processing so that the background image can be viewed from the virtual viewpoint position as the background of the virtual viewpoint image. The multiple virtual viewpoint image generation unit 1903 then subjects the moved subject shapes viewed from the virtual viewpoint position to rendering (coloring processing) by using the coloring information for the image data captured by the actual cameras at the playback time to generate a virtual viewpoint image. In a case where the subject position difference calculation unit 1901 inputs the difference virtual viewpoint information resulting from the calculation of the subject difference information, the multiple virtual viewpoint image generation unit 1903 generates a virtual viewpoint image at a specified position in the difference virtual viewpoint information and then combines the generated virtual viewpoint image with the virtual viewpoint image based on a user input. Lastly, the multiple virtual viewpoint image generation unit 1903 outputs the virtual viewpoint image to the image output unit 413.

Figure 15:
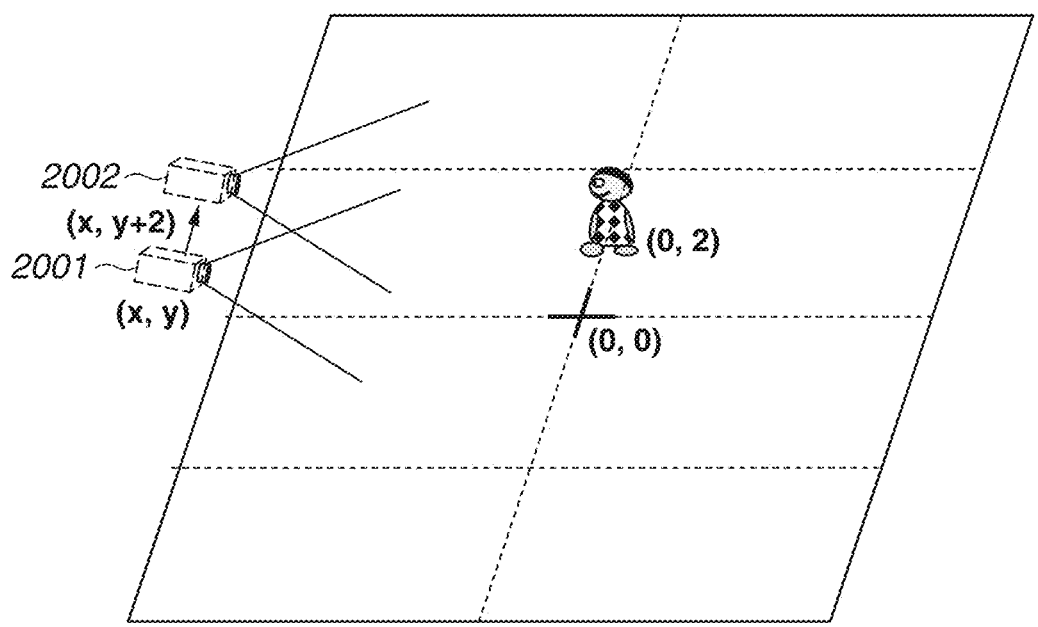
FIG. 15 illustrates an example installation of virtual cameras according to one or more aspects of the present disclosure.

FIG. 15 is a conceptual view illustrating virtual camera positions with respect to a subject position to be moved in the virtual space. With the position of the center of the floor surface (0, 0) as the origin, the subject position information after the movement of a subject is also set to the position of the center of the floor surface (0, 0). The unit of position is meter. In a case where a subject is arranged at the reference position (0, 0) with the position of the subject before the subject movement being (0, 2), the position of a virtual camera 2001, (x, y), is moved to the position (x, y+2) by an offset (0, 2). The subject is then captured by the moved virtual camera 2001 and a virtual viewpoint image is generated. The generated virtual viewpoint image is combined with the virtual viewpoint image corresponding to the virtual camera 2001 that captured subjects other than the subject to be moved.

The fourth exemplary embodiment generates a virtual viewpoint image by moving the virtual cameras with respect to the subject to be moved, and then combines the generated virtual viewpoint image with the virtual viewpoint image corresponding to the virtual camera that captured subjects other than the subject to be moved. Thus, the position of the subject can be moved only by combining virtual viewpoint images.

Other Exemplary Embodiments

In an above exemplary embodiment, descriptions have been provided of an example in which the shape data of a subject is rearranged in accordance with the deviation between the subject position and the reference position and a virtual viewpoint image is generated. However, the present disclosure is not limited thereto. In another exemplary embodiment, a virtual viewpoint image including information that enables recognition of a deviation between the subject position and the reference position may be generated. For example, the shape data may be arranged at determined subject positions, and at the same time information indicating the reference positions (e.g., grid points or straight lines) may be displayed. The shape data may be arranged at the subject positions, and the subjects may be displayed so that a subject deviating from the reference position can be identified. For example, the shape data of the subject deviating from the reference position may be surrounded by lines, or the subject is highlighted by changing its color or lightness. These methods enable the user monitoring a virtual viewpoint image to recognize a deviation between the subject position and the reference position. For example, in a case where a performer wishes to check the standing position by viewing the generated virtual viewpoint image, the deviation of the position of the performer can be easily recognized regardless of the virtual viewpoint position.

The present disclosure can also be achieved when a program for implementing at least one of the functions according to the above-described exemplary embodiments is supplied to a system or apparatus via a network or storage medium, and at least one processor in a computer of the system or apparatus reads and executes the program. The present disclosure can also be achieved by a circuit (for example, an Application Specific Integrated Circuit (ASIC)) for implementing at least one function.

The present disclosure makes it possible to generate a virtual viewpoint image that is applicable to a difference between a position of the subject and a desired position.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2020-207877, filed Dec. 15, 2020, and No. 2021-146788, filed Sep. 9, 2021, which are hereby incorporated by reference herein in their entirety.

What is claimed is:

1. A generation apparatus comprising:
one or more memories storing instructions; and one or more processors executing the instructions to:
acquire shape data representing a shape of a subject based on a plurality of captured images obtained by a plurality of imaging apparatuses capturing the subject in an imaging region;
determine a subject position which is a position of the subject in the imaging region;
determine a reference position serving as a reference of the position of the subject; and
generate a virtual viewpoint image by arranging the shape data in accordance with a deviation between the determined subject position and the determined reference position.

2. The generation apparatus according to claim 1, wherein the one or more processors further execute the instructions to change the determined subject position so that the deviation is smaller than a predetermined threshold value, and generate the virtual viewpoint image by arranging the shape data based on the changed subject position.

3. The generation apparatus according to claim 1, wherein the one or more processors further execute the instructions to change the subject position so that the determined subject position coincides with the reference position, based on the deviation, and generate the virtual viewpoint image by arranging the shape data, based on the changed subject position.

4. The generation apparatus according to claim 1, wherein the reference position is determined based on grid points arranged at predetermined intervals.

5. The generation apparatus according to claim 1, wherein the reference position is a position outside the imaging region.

6. The generation apparatus according to claim 5, wherein the one or more processors further execute the instructions to determine the reference position so that the plurality of subject positions is set at positions in a predetermined straight line.

7. The generation apparatus according to claim 1, wherein the one or more processors further execute the instructions to,
determine a plurality of subject positions corresponding to a plurality of subjects in the imaging region, and
determine the reference position based on the determined plurality of subject positions.

8. The generation apparatus according to claim 7, wherein the one or more processors further execute the instructions to determine the reference position so that the plurality of subject positions is arranged at predetermined intervals.

9. The generation apparatus according to claim 1, wherein the one or more processors further execute the instructions to determine the subject position based on the shape of the subject represented by the acquired shape data.

10. The generation apparatus according to claim 9, wherein the one or more processors further execute the instructions to determine a position of a center of gravity of the shape of the subject represented by the shape data to be the subject position.

11. The generation apparatus according to claim 9, wherein the one or more processors further execute the instructions to determine a position of a predetermined portion of the shape of the subject represented by the shape data to be the subject position.

12. The generation apparatus according to claim 1, wherein the one or more processors further execute the instructions to generate the virtual viewpoint image including information that enables recognition of the deviation.

13. The generation apparatus according to claim 12, wherein the one or more processors further execute the instructions to generate, as the information that enables recognition of the deviation, the virtual viewpoint image including information that represents the determined subject position and the determined reference position.

14. The generation apparatus according to claim 12, wherein the one or more processors further execute the instructions to generate, as the information that enables recognition of the deviation, the virtual viewpoint image including information that enables identification of a subject of which the position deviating from the reference position is determined to be the subject position.

15. A generation method comprising:
acquiring shape data representing a shape of a subject based on a plurality of captured images obtained by a plurality of imaging apparatuses capturing the subject in an imaging region;
determining a subject position which is a position of the subject in the imaging region;
determining a reference position serving as a reference of the position of the subject; and
generating a virtual viewpoint image by arranging the shape data in accordance with a deviation between the determined subject position and the determined reference position.

16. A non-transitory computer-readable storage medium storage medium storing a program that, when executed by a computer, causes the computer to perform a method comprising:
acquiring shape data representing a shape of a subject based on a plurality of captured images obtained by a plurality of imaging apparatuses capturing the subject in an imaging region;
determining a subject position which is a position of the subject in the imaging region;
determining a reference position serving as a reference of the position of the subject; and
generating a virtual viewpoint image by arranging the shape data in accordance with a deviation between the determined subject position and the determined reference position.

* * * * *